US010968383B2

(12) United States Patent
Ayirala et al.

(10) Patent No.: US 10,968,383 B2
(45) Date of Patent: Apr. 6, 2021

(54) WATER TREATMENT SCHEMES FOR INJECTION WATER FLOODING RECOVERY PROCESSES IN CARBONATE RESERVOIRS

(71) Applicant: Saudi Arabian Oil Company, Dhahran (SA)

(72) Inventors: Subhash Chandrabose Ayirala, Dhahran (SA); Ali Abdallah Al-Yousef, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/597,448

(22) Filed: Oct. 9, 2019

(65) Prior Publication Data
US 2020/0040253 A1  Feb. 6, 2020

Related U.S. Application Data

(62) Division of application No. 15/673,029, filed on Aug. 9, 2017, now Pat. No. 10,479,928.
(Continued)

(51) Int. Cl.
*C09K 8/594* (2006.01)
*C02F 1/04* (2006.01)
(Continued)

(52) U.S. Cl.
CPC ............. *C09K 8/594* (2013.01); *C02F 1/041* (2013.01); *C02F 1/08* (2013.01); *C02F 1/441* (2013.01);
(Continued)

(58) Field of Classification Search
None
See application file for complete search history.

(56) References Cited

U.S. PATENT DOCUMENTS 7,600,567 B2   10/2009   Christopher et al.
7,726,398 B2    6/2010   Collins et al.
(Continued)

OTHER PUBLICATIONS

Ayirala, S., et al.; "A Critical Review of Water Chemistry Alteration Technologies to Develop Novel Water Treatment Schemes for SmartWater Flooding in Carbonate Reservoirs" SPE 179564-MS, SPE Improved Oil Recovery Conference, Apr. 11-13, 2016; pp. 1-21.
(Continued)

*Primary Examiner* — Jeffrey D Washville
(74) *Attorney, Agent, or Firm* — Bracewell LLP; Constance G. Rhebergen; Brian H. Tompkins

(57) ABSTRACT

Disclosed are water treatment apparatus and processes for the generation of injection water from seawater and produced water. The first water treatment apparatus includes a reverse osmosis (RO) unit that treats the seawater, a pretreatment unit that pretreats the produced water, and a carrier gas extraction (CGE) unit or dynamic vapor recompression (DyVaR) that treats the pretreated produced water and generates fresh water. The fresh water and the RO permeate are mixed with a portion of the seawater to generate the injection water. A second water treatment apparatus includes a reverse osmosis (RO) unit and a nanofiltration (NF) that treats the seawater in parallel, a pretreatment unit that pretreats the produced water, and a CGE unit or DyVaR unit that treats the pretreated produced water and generates fresh water. The fresh water and the RO permeate are mixed with the NF reject to generate injection water.

12 Claims, 5 Drawing Sheets

Related U.S. Application Data

(60) Provisional application No. 62/428,279, filed on Nov. 30, 2016.

(51) Int. Cl.

| | | |
|---|---|---|
| *C02F 1/08* | (2006.01) | |
| *C09K 8/58* | (2006.01) | |
| *C02F 9/00* | (2006.01) | |
| *E21B 43/20* | (2006.01) | |
| *E21B 43/24* | (2006.01) | |
| *E21B 43/40* | (2006.01) | |
| *C02F 1/44* | (2006.01) | |
| C02F 103/08 | (2006.01) | |
| C02F 1/72 | (2006.01) | |
| C02F 103/10 | (2006.01) | |
| E21B 49/08 | (2006.01) | |
| E21B 47/00 | (2012.01) | |

(52) U.S. Cl.
CPC ............... *C02F 1/442* (2013.01); *C02F 9/00* (2013.01); *C09K 8/58* (2013.01); *E21B 43/20* (2013.01); *E21B 43/24* (2013.01); *E21B 43/40* (2013.01); *C02F 1/72* (2013.01); *C02F 2103/08* (2013.01); *C02F 2103/10* (2013.01); *C02F 2209/05* (2013.01); *C02F 2301/043* (2013.01); *E21B 47/00* (2013.01); *E21B 49/0875* (2020.05); *Y02A 20/131* (2018.01)

(56) References Cited

U.S. PATENT DOCUMENTS

| | | | |
|---|---|---|---|
| 8,789,594 | B2 | 7/2014 | Curole et al. |
| 8,794,320 | B2 | 8/2014 | Ayirala et al. |
| 9,234,413 | B2 | 1/2016 | Ayirala et al. |
| 2009/0194272 | A1 | 8/2009 | Baillie |
| 2009/0308609 | A1* | 12/2009 | Curole .................... E21B 43/20 166/275 |
| 2012/0125611 | A1 | 5/2012 | Ayirala et al. |
| 2012/0227975 | A1 | 9/2012 | Ayirala et al. |
| 2013/0161256 | A1 | 6/2013 | Henthorne et al. |
| 2015/0083656 | A1 | 3/2015 | Williams |
| 2015/0345277 | A1* | 12/2015 | Schooley ............... C09K 8/592 166/267 |

OTHER PUBLICATIONS

Ayirala, S., et al.; "A Designer Water Process for Offshore Low Salinity and Polymer Flooding Applications" SPE 129926, SPE Improved Oil Recovery Symposium, Apr. 24-28, 2010; pp. 1-12.

BusinessWire; "STW Resources to Present Its Salttech Water Desalination Technology to Texas State Capitol May 13 and 14" available as of Nov. 11, 2016 at the website: http://www.businesswire.com/news/home/20150511006283/en/STW-Resources-Present-Salttech-Wat.

Henthorne, L., et al.; "Developing and Piloting Water Treatment Technologies to Address Offshore EOR challenges" SPE 165241, SPE Enhanced Oil Recovery Conference, Jul. 2-4, 2013; pp. 1-7.

International Search Report and Written Opinion for International Application No. PCT/US2017/063841 (SA5640); International Filing Date Nov. 30, 2017; Report dated Feb. 2, 2018 (pp. 1-14).

Passut, Charlie; "Texas Plant Deploys Promising Technology to Clean Produced Water" Natural Gas Intelligence, Jul. 11, 2014; pp. 1-2.

Salttech—Blue Tech Research Company Snapshot, available as of Nov. 11, 2016 at the website: http://inside.bluetechresearch.com/tools/innovation-tracker/salttech; pp. 1-2.

Water Technology Market; "STW Water Process to showcase Salttech water desalination technology in Texas, US" available as of Nov. 11, 2016 at the website: http://www.water-technology.net/news/newsstw-water-process-to-showcase-salttech-water-desalination-tec.

Whitfield, Stephen; "Unconventional Resources: New Facilities Find Solutions to Limited Water Sources" Oil and Gas Facilities, Dec. 2014; pp. 11-20.

Yousef, A.A., et al.; "Optimization Study of a Novel Water-Ionic Technology for Smart-Waterflooding Application in Carbonate Reservoirs" SPE 169052, SPE Improved Oil Recovery Symposium, Apr. 12-16, 2014; pp. 72-82.

\* cited by examiner

WATER TREATMENT SCHEMES FOR INJECTION WATER FLOODING RECOVERY PROCESSES IN CARBONATE RESERVOIRS

CROSS-REFERENCE TO RELATED APPLICATIONS

This application is a divisional of and claims priority from U.S. Non-Provisional application Ser. No. 15/673,029 filed Aug. 9, 2017, and titled "WATER TREATMENT SCHEMES FOR INJECTION WATER FLOODING RECOVERY PROCESSES IN CARBONATE RESERVOIRS," which claims priority from U.S. Provisional Application No. 62/428,279 filed Nov. 30, 2016, and titled "WATER TREATMENT SCHEMES FOR INJECTION WATER FLOODING RECOVERY PROCESSES IN CARBONATE RESERVOIRS," each of which are incorporated by reference for purposes of United States patent practice.

BACKGROUND

Field of the Disclosure

Embodiments of the disclosure generally relate to generally relate to formation treatment fluids and, more specifically, to the production of enhanced oil recovery fluids.

Description of the Related Art

The use of enhanced oil recovery (EOR) processes has greatly benefited the oil and gas industry by increasing the production of problematic and underperforming hydrocarbon-bearing wells and fields. The EOR processes used in modern oil and gas operations may include chemical, hydrochemical, thermal, fluid/superfluid and microbial based processes as well as the relatively recent plasma-pulse technology (PPT). Water injection (alternatively referred to as water flooding) has been widely used to increase the conductivity or flow of liquid hydrocarbons in subterranean reservoir treated using EOR techniques. The water sources for water injection may be derived from fresh water sources, (for example, aquifers or surface water), saltwater/brackish sources (for example, river/sea water mixtures), as well as wastewater from oil fields (for example produced water/other treated water effluents).

SUMMARY

The use of water flooding processes may be used for EOR operations in carbonate reservoirs to increase oil recovery. Such water flooding processes involve injection water having a lower salinity (e.g., lower than seawater) and a specific ion composition. Such water flooding processes may be generally regarded as environmentally safe. Further such water flooding may improve microscopic sweep efficiency and release more oil from reservoir pores.

The injection water used in such EOR operations may be enriched in divalent ions (e.g., sulfate ions, calcium ions, and magnesium ions) to achieve a specific monovalent ion (e.g., sodium ions, and chlorine ions) to divalent ion content. Achieving a desired salinity and ion composition of injection water, and providing the tuning and flexibility in water chemistry to achieve the salinity and ion composition, may be challenging for production of injection water, especially at well sites. For example, most onshore and offshore well sites may have limited access to sources of water, and seawater, produced water, or both may be the most convenient water sources. Consequently, water chemistry alteration, and removal and enrichment of ions in both seawater and produced water, are challenges for well site production of injection water.

In one embodiment, a water treatment apparatus for generating injection water from seawater and produced water is provided. The water treatment apparatus includes a reverse osmosis (RO) unit operable to receive seawater and produce an RO permeate and an RO reject. The water treatment apparatus also includes a carrier gas extraction (CGE) unit or a dynamic vapor recompression (DyVaR) unit operable to receive pretreated produced water and the RO reject and produce fresh water. The fresh water is mixed with the RO permeate and a portion of the seawater to generate injection water, the injection water having a salinity in the range of 5,000 parts-per-million (ppm) TDS to 6,000 ppm TDS. In some embodiments, the water treatment apparatus includes a pretreatment unit operable to receive produced water and output the pretreated produced water. In some embodiments, the RO permeate has a salinity of less than 500 ppm TDS. In some embodiments, the water treatment apparatus is a zero liquid discharge (ZLD) apparatus. In some embodiments, the produced water has a salinity of at least 50,000 ppm TDS. In some embodiments, the volumetric ratio of the portion of seawater to a combination of the fresh water and the RO permeate is in the range of 10:90 to 20:80.

In another embodiment, a method for generating injection water from seawater and produced water is provided. The method includes providing seawater to a reverse osmosis (RO) unit operable to produce an RO permeate and an RO reject and providing pretreated produced water and the RO reject to a carrier gas extraction (CGE) unit or a dynamic vapor recompression (DyVaR) unit operable to produce fresh water. The method also includes mixing the fresh water the RO permeate and a portion of the seawater to generate injection water, the injection water having a salinity in the range of 5,000 parts-per-million (ppm) TDS to 6,000 ppm TDS. In some embodiments, the method includes providing produced water to a pretreatment unit to produce the pretreated water. In some embodiments, the RO permeate has a salinity of less than 500 ppm TDS. In some embodiments, the produced water has a salinity of at least 50,000 ppm TDS. In some embodiments, the volumetric ratio of the portion of seawater to a combination of the fresh water and the RO permeate is in the range of 10:90 to 20:80.

In another embodiment, a water treatment apparatus for generating injection water from seawater and produced water is provided. The water treatment apparatus includes a reverse osmosis (RO) unit operable to receive a first portion of seawater and produce an RO permeate and an RO reject and a nanofiltration unit operable to receive a second portion of seawater and produce an NF permeate and an NF reject. The water treatment apparatus also includes a carrier gas extraction (CGE) unit or a dynamic vapor recompression (DyVaR) unit operable to receive pretreated produced water and the RO reject and produce fresh water. The resulting fresh water is mixed with the RO permeate and the NF reject to generate injection water, the injection water having a salinity in the range of 5,000 parts-per-million (ppm) TDS to 6,000 ppm TDS. In some embodiments, the NF permeate is recycled to mix with the seawater. In some embodiments, the RO permeate has a salinity of less than 500 ppm TDS. In some embodiments, the NF reject has a salinity of at least 50,000 ppm TDS. In some embodiments, the NF permeate has a salinity of less than 40,000 ppm TDS. In some embodiments, the water treatment apparatus is a zero liquid discharge (ZLD) apparatus. In some embodiments, the produced water has a salinity of at least 50,000 ppm TDS. In some embodiments, the NF unit includes a membrane having a pore size in the range of 0.05 microns to 0.005 microns. In some embodiments, the volumetric ratio of the NF reject to a combination of the fresh water and the RO permeate is in the range of 5:95 to 15:75.

In yet further embodiments, a method for generating injection water from seawater and produced water. The method includes providing a first portion of seawater to a reverse osmosis (RO) unit operable to produce an RO permeate and an RO reject and providing a second portion of the seawater to a nanofiltration (NF) unit operable to produce an NF permeate and an NF reject. The method also includes providing pretreated produced water and the RO reject to a carrier gas extraction (CGE) unit or a dynamic vapor recompression (DyVaR) unit operable to produce fresh water. The method further includes mixing the fresh water with the RO permeate and NF reject to generate injection water, the injection water having a salinity in the range of 5,000 parts-per-million ppm TDS to 6,000 ppm TDS. In some embodiment, the method includes providing produced water to a pretreatment unit to produce the pretreated water. In some embodiments, the RO permeate has a salinity of less than 500 ppm TDS. In some embodiments, the NF reject has a salinity of at least 50,000 ppm TDS. In some embodiments, the NF permeate has a salinity of less than 40,000 ppm TDS. In some embodiments, the produced water comprises a salinity of at least 50,000 ppm TDS. In some embodiments, the method includes recycling the NF permeate to mix with the seawater. In some embodiments, the method includes providing a portion of the NF reject to the CGE unit of the DyVaR unit to produce the fresh water. In some embodiments, the volumetric ratio of the NF reject to a combination of the fresh water and the RO permeate is in the range of 5:95 to 15:75.

DETAILED DESCRIPTION

Figure 1A:
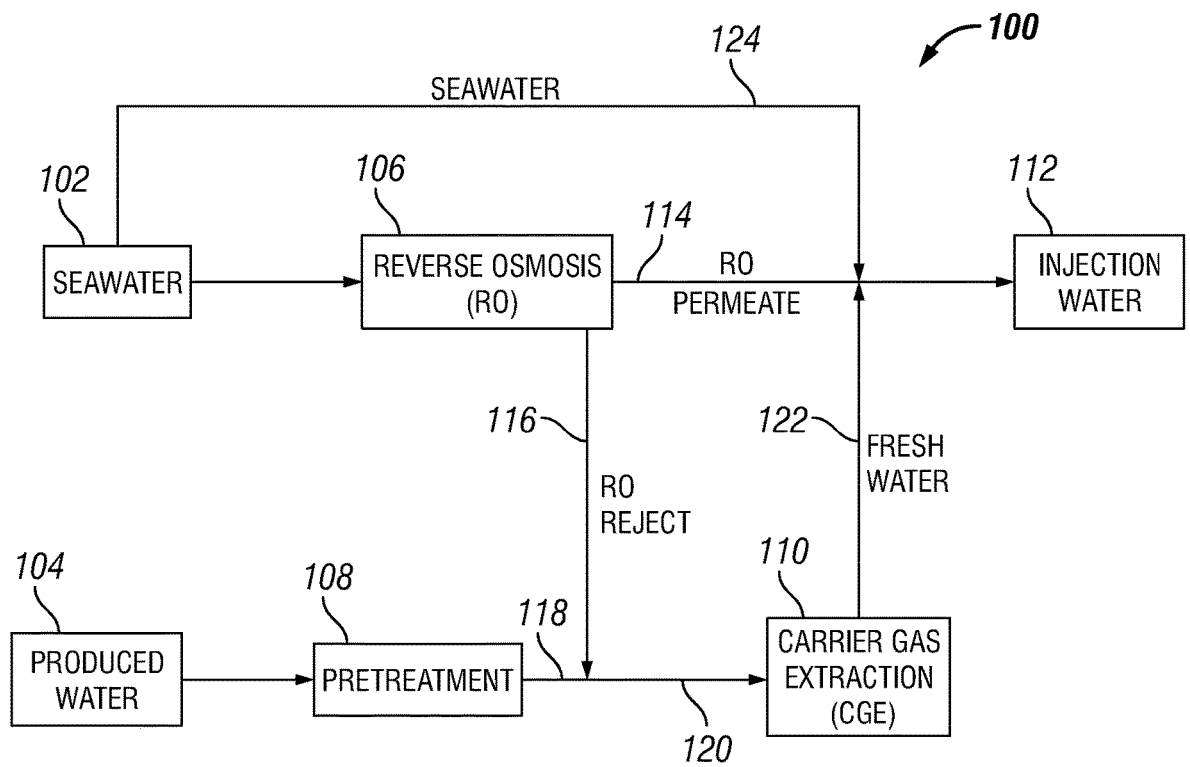
FIGS. 1A and 1B are schematic diagrams of a water treatment apparatus for generating injection water from seawater and produced water in accordance with embodiments of the disclosure.

The present disclosure will now be described more fully hereinafter with reference to the accompanying drawings, which illustrate embodiments of the disclosure. This disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art.

As used in the disclosure, the term "injection water" refers to an aqueous solution of ions suitable for enhancing oil recovery in carbonate reservoirs and having a salinity in the range of about 5,000 parts-per-million (ppm) total dissolved solids (TDS) to about 6,000 ppm TDS, such that the aqueous solution includes a concentration of one or more of the following ions suitable for enhancing oil recovery: sodium, calcium, magnesium, sulfate, and chloride ions. As will be appreciated, although composition of injection water is discussed in terms of ion composition, ions may exist or be expressed as components of salts suitable for enhancing oil recovery, such as sodium chloride (NaCl), calcium chloride ($CaCl_2$)), magnesium chloride ($MgCl_2$), sodium sulfate ($Na_2SO_4$) and magnesium sulfate ($MgSO_4$).

Embodiments of the disclosure include water treatment apparatus and processes for the generation of injection water from seawater (for example, water having a salinity in the range of about 30,000 ppm TDS to about 60,000 ppm TDS) and produced water. As used herein, the term "produced water" refers to water produced as a byproduct during the production of oil and gas. Produced water may include high salinity produced water having a salinity of at least 50,000 ppm TDS. Embodiments of the disclosure include water treatment apparatus that receive seawater and produced water to generate injection water. In some embodiments, the first water treatment apparatus includes a reverse osmosis (RO) unit that treats the seawater and a pretreatment unit that pretreats the produced water. The first water treatment apparatus also includes a carrier gas extraction (CGE) unit or dynamic vapor recompression (DyVaR) unit that treats the pretreated produced water and produces fresh water. As used herein the term "fresh water" refers to water having a salinity less than 1,000 ppm TDS. The fresh water from the carrier gas extraction (CGE) unit or dynamic vapor recompression (DyVaR) unit and the RO permeate are mixed with a portion of the seawater to generate injection water.

In some embodiments, a second water treatment apparatus includes parallel treatment of the seawater via reverse osmosis (RO) and nanofiltration (NF). The second water treatment apparatus includes a reverse osmosis (RO) unit that treats a first portion of the seawater and a nanofiltration (NF) unit that treats a second portion of the seawater. The second water treatment apparatus also includes a pretreatment unit that pretreats the produced water and a carrier gas extraction (CGE) unit or dynamic vapor recompression (DyVaR) unit that treats the pretreated produced water to produce fresh water. The fresh water from the carrier gas extraction (CGE) unit or dynamic vapor recompression (DyVaR) unit and the RO permeate are mixed with the NF reject to generate injection water. The NF permeate is recycled and mixed with the feed seawater.

Figure 1B:
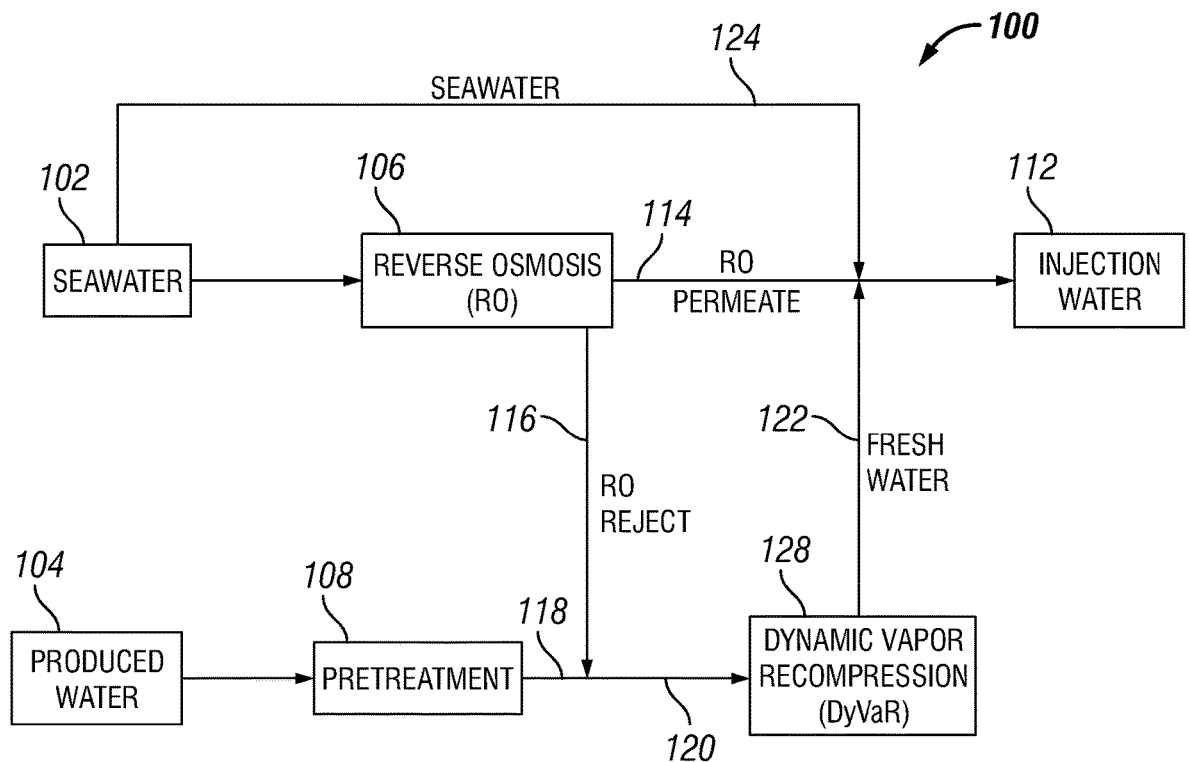

Water Treatment Apparatus for Generating Injection Water from Seawater and Produced Water FIGS. 1A and 1B depict a water treatment apparatus 100 for the generation of injection water from seawater and production water in accordance with embodiments of the disclosure. The water treatment apparatus 100 shown in FIGS. 1A and 1B includes production water treatment and may be a zero liquid discharge (ZLD) process. As shown in FIGS. 1A and 1B, the water treatment apparatus 100 receives seawater 102 and produced water 104 and includes a reverse osmosis (RO) unit 106, and a pretreatment unit 108. In some embodiments, as shown in FIG. 1A, the water treatment apparatus 100 includes a carrier gas extraction (CGE) unit 110. In other embodiments, as shown in FIG. 2, the water treatment apparatus 100 includes a dynamic vapor recompression (DyVaR) unit instead of the CGE unit 110. The water treatment apparatus 100 generates injection water 112 from the seawater 102 and produced water 104 for use in EOR operations. The injection water 112 produced by the water treatment apparatus 100 may include specific concentrations of divalent ions and monovalent ions suitable for enhancing oil recovery in carbonate reservoirs and may have a salinity in the range of about 5,000 ppm TDS to about 6,000 ppm TDS.

As shown in FIG. 1, the seawater 102 is treated in the RO unit 106 to produce RO permeate 114 and RO reject 116. In some embodiments, the RO unit 106 has a membrane with a pore size of less than 0.00005 microns. The RO unit 106 may reject both monovalent ions and divalent ions from the seawater 102 and, in some embodiments, may operate at a rejection efficiency of greater than 99%. As used herein, the term "rejection efficiency" refers to the ion rejection efficiency on a concentration basis. For example, if a feed water contains 10,000 ppm of sodium ions and 1,000 ppm calcium ions, an RO unit having a rejection efficiency of greater than 99% would reject both of these monovalent and divalent ions by greater than 99%, resulting in a permeate having no more than 100 ppm sodium ions and 10 ppm calcium ions. The RO permeate 114 produced by the RO unit 106 may be fresh water having a salinity of greater than 0 ppm TDS but less than 500 ppm TDS. In some embodiments, the RO permeate 114 has a salinity of greater than 0 ppm TDS but less than 300 ppm TDS. The RO reject 116 may be a concentrate rich in monovalent ions and divalent ions.

The produced water 104 is pretreated in the pretreatment unit 108 to remove oil, grease, and solids to produced pretreated produced water 118. The pretreatment unit 108 may include filtration-based pretreatment, chemical based filtration, or a combination thereof. For example, the pretreatment unit may be a filtration unit having a filtration media (e.g., nutshell filters), a chemical extraction unit that performs oxidation using suitable chemicals (e.g., ozone, hydrogen, and peroxide) and other selective chemical extraction, or a combination thereof. In some embodiments, the produced water 104 is high salinity produced water (for example, produced water having a salinity greater than 50,000 ppm TDS). Thus, in such embodiments, the pretreated produced water 118 also has a similar salinity to the produced water 104 fed to the pretreatment unit 108.

The pretreated produced water 118 may be mixed with the RO reject 116, and the mixed water 120 may be desalinated in the CGE unit 110 to produce fresh water 122. The CGE unit 110 may operate at atmospheric pressure and moderate temperatures and uses a carrier gas to extract fresh water from the mixed water 120. In some embodiments, the carrier gas of the CGE unit 110 is dry air. As will be appreciated, the CGE unit 110 operates by heating the mixed water 120 and spraying the heated water onto porous material having a large surface area to directly contact the carrier gas. The water vapor saturated carrier gas is then processed in a multistage bubble column (acting as both a heat exchanger and a mass exchanger) such that the saturated carrier gas is passed as bubbles into water filled trays through a series of holes. During this exchange process, the water vapor in the bubbles becomes cooled and condenses to generate fresh water in the trays that then exits the CGE unit 110 as fresh water 122. In some embodiments, the CGE unit 110 has a recovery efficiency in the range of about 85% to about 90%. As used herein, the term "recovery efficiency" refers to permeate water recovery efficiency on volumetric basis. For example, for a feed water volume of 10,000 barrels (bbls), a 50% recovery efficiency would produce 5,000 bbls of permeate, where as a 75% recovery efficiency from would yield 7,500 bbls of permeate.

As shown in FIG. 1A, a portion 124 of the seawater 102 may be mixed with the fresh water 122 from the CGE unit 110 and the RO permeate 114 to produce the injection water 112 having ion concentrations suitable for enhancing oil recovery in carbonate reservoirs and having a salinity in the range of about 5,000 ppm TDS to about 6,000 ppm TDS. For example, the salinity of the seawater portion 124 may be modified to a desired salinity (for example, 5,000 ppm TDS to 6,000 ppm TDS) by diluting the seawater with the fresh water 122 and the RO permeate 114. In some embodiments, the water treatment apparatus 100 includes a mixer for mixing the portion 124 of the seawater 102, the fresh water 122 from the CGE unit 110, and the RO permeate 114. The mixer may include a static mixer or a powered mixing apparatus with moving components. The mixer may be, for example, an in-line mixer, a t-line mixer, or other suitable mixing apparatus. In some embodiments, the injection water 112 may be generated by mixing seawater portion 124 to combined fresh water 122 and the RO permeate 114 in a volumetric ratio in the range of about 10:90 to about 20:80. In some embodiments, the injection water 112 generated by the water treatment apparatus 100 may have a mass ratio of monovalent ions (sodium and chloride ions) to divalent ions (calcium, magnesium, and sulfate ions) of in the range of about 5 to about 10. In some embodiments, the injection water 112 may have a have a mass ratio of monovalent ions (sodium and chloride ions) to divalent ions (calcium, magnesium, and sulfate ions) of about 7.

FIG. 1B depicts an alternate embodiment of the water treatment apparatus 100 for the production of injection water from seawater and production water in accordance with an embodiment of the disclosure. The water treatment apparatus 100 shown in FIG. 1B also includes production water treatment and may be a zero liquid discharge (ZLD) process. As shown in FIG. 1B, the water treatment apparatus 100 receives seawater 102 and produced water 104 and includes the reverse osmosis (RO) unit 106, the pretreatment unit 108, and a dynamic vapor recompression (DyVaR) unit 128 instead of the CGE unit 110.

As discussed above, the pretreated produced water 118 from the pretreatment unit 108 may be mixed with the RO reject 116 to produce the mixed water 120. As shown in FIG. 1B, the mixed water 120 may be desalinated in the DyVaR unit 128 to produce the fresh water 122. As will be appreciated, the DyVaR unit 128 operates via a mechanical vapor recompression, such that water is evaporated at moderate temperatures by applying a vacuum and then subsequently condensed. The DyVaR unit 128 includes a cyclone in the evaporation stage to separate crystallized salts from the water via centrifugal force. In some embodiments, the DyVaR unit 128 may have a recovery efficiency of at least 97%. The reject may be collected as crystallized salts or a concentrated brine. In some embodiments having the DyVaR unit 128, the pretreatment of the produced water 104 may be reduced or omitted. For example, the pretreatment unit 108 may include a less rigorous pretreatment or may be omitted from the water treatment apparatus 100. Thus, in some embodiments, the water treatment apparatus 100 shown in FIG. 1B may omit the pretreatment unit 108 and the DyVaR unit 128 may receive the produced water 104 without pretreatment.

As shown in FIG. 1B, a portion 124 of the seawater 102 may be mixed with the fresh water 122 from the DyVaR unit 128 and the RO permeate 114 to produce the injection water 112 having ion concentrations suitable for enhancing oil recovery in carbonate reservoirs and having a salinity in the range of about 5,000 ppm TDS to about 6,000 ppm TDS. As discussed above, the salinity of the seawater portion 124 may be modified to a desired salinity (for example, 5,000 ppm TDS to 6,000 ppm TDS) by diluting the seawater with the fresh water 122 and the RO permeate 114. In some embodiments, the water treatment apparatus 100 includes a mixer for mixing the portion 124 of the seawater 102, the fresh water 122 from the DyVaR unit 128, and the RO permeate 114. The mixer may include a static mixer or a powered mixing apparatus with moving components. The mixer may be, for example, an in-line mixer, a t-line mixer, or other suitable mixing apparatus. In some embodiments, mixing the seawater portion 124 with the fresh water (i.e., the fresh water 122 and RO permeate 114) may provide for the depletion of monovalent ions while maintaining minimum specific amounts of divalent ions in the injection water 112. In some embodiments, the injection water 112 may be generated by mixing seawater portion 124 to combined fresh water 122 and the RO permeate 114 in a volumetric ratio in the range of about 10:90 to about 20:80. In some embodiments, the injection water 112 generated by the water treatment apparatus 100 may have a mass ratio of monovalent ions (sodium and chloride ions) to divalent ions (calcium, magnesium, and sulfate ions) of about 7.

In some embodiments, the inlet streams and outlet streams of one or more units of water treatment apparatus 100 may be analyzed for salinity and the concentration of various ions. For example, the outlet streams of the units of water treatment apparatus 100 may be analyzed using ion chromatography to determine ion concentrations. In some embodiments, the water treatment apparatus 100 may include real-time water composition monitoring sensor water treatment apparatus at various locations for determining salinity and ion concentrations of different inlet streams and outlet streams. In some embodiments, for example, the inlet streams, the outlet streams, or both of the RO unit 106, the CGE unit 110, the DyVaR unit 128, or any combination thereof may be analyzed to determine salinity and ion concentration.

Figure 2A:
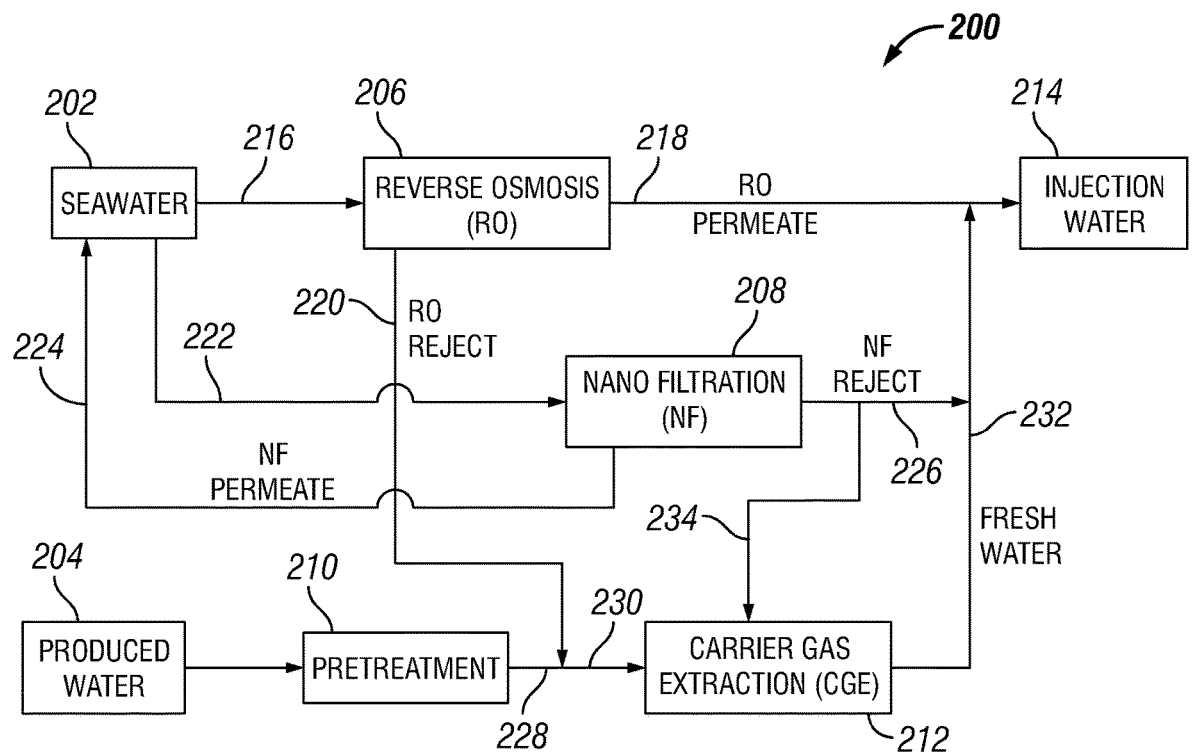
FIGS. 2A and 2B are schematic diagrams of a water treatment apparatus for generating injection water from seawater and produced water in accordance with additional embodiments of the disclosure.
Figure 2B:
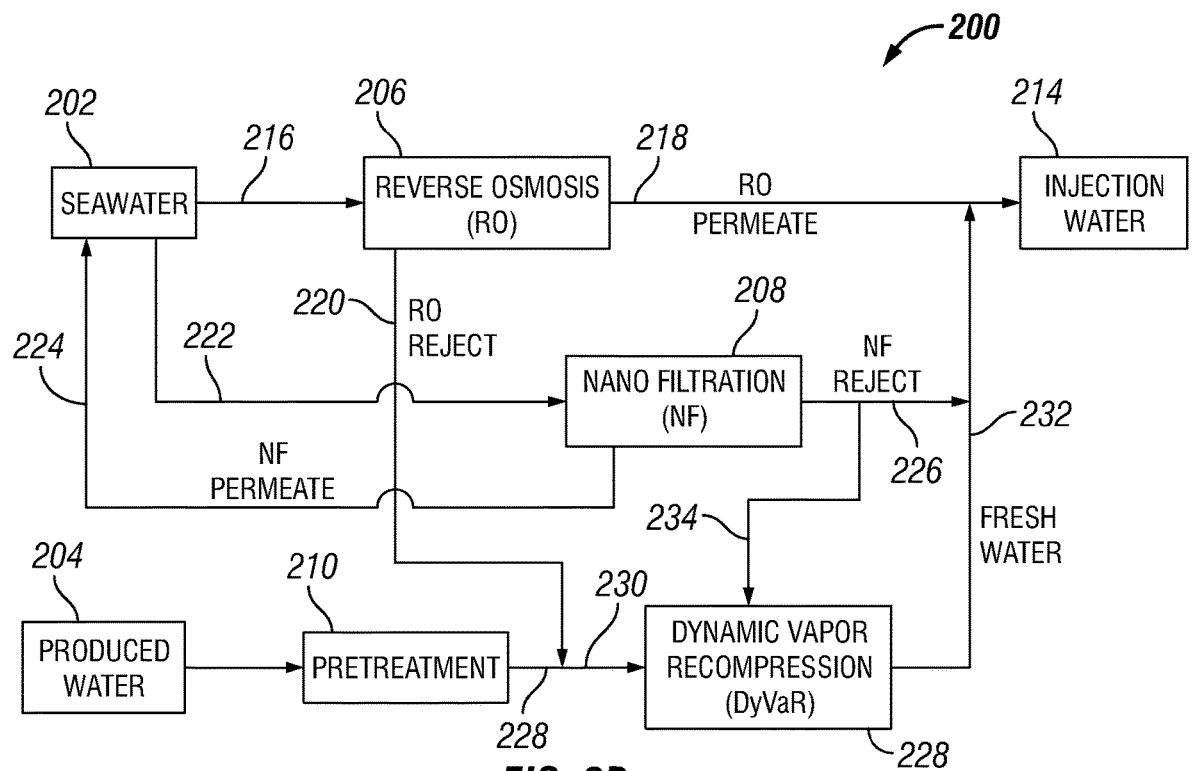

FIGS. 2A and 2B depict a water treatment apparatus 200 for the production of injection water from seawater and production water in accordance with additional embodiments of the disclosure. The water treatment apparatus 200 shown in FIGS. 2A and 2B includes production water treatment and may be a zero liquid discharge (ZLD) process. As shown in FIGS. 2A and 2B, the water treatment apparatus 200 receives seawater 202 and produced water 204 and includes a reverse osmosis (RO) unit 206, a nanofiltration (NF) unit 208 and a pretreatment unit 210. In some embodiments, as shown in FIG. 2A, the water treatment apparatus 200 includes a carrier gas extraction (CGE) unit 212. In other embodiments, as shown in FIG. 2B, the water treatment apparatus 200 includes a dynamic vapor recompression (DyVaR) unit instead of the CGE unit 212. The water treatment apparatus 200 generates injection water 214 from the seawater 202 and produced water 204 for use in EOR operations. The injection water 214 produced by the water treatment apparatus 200 may include specific concentrations (e.g., minimum or maximum concentrations) of divalent ions and monovalent ions suitable for enhancing oil recovery in carbonate reservoirs and may have a salinity in the range of about 5,000 ppm TDS to about 6,000 ppm TDS. As compared to the water treatment apparatus 100 discussed above and shown in FIGS. 1A and 1B may, the water treatment apparatus 200 may provide tuning flexibility to modify the concentration of divalent ions (e.g., sulfate ions, calcium ions, and magnesium ions) and reduce monovalent ions (e.g., sodium ions and chloride ions) in the generated injection water 214.

As shown in FIGS. 2A and 2B, the seawater 202 is split into two separate portions and treated in parallel RO and NF processes. A first portion 216 of the seawater 202 is treated in the RO unit 206 to produce RO permeate 218 and RO reject 220. The RO unit 206 may be similar to the RO unit 106 described above. In some embodiments, the RO unit 206 may operate at a rejection efficiency of greater than 99%. The RO unit 206 may reject both divalent ions and monovalent ions such that the RO permeate 218 may be fresh water having a salinity of greater than 0 ppm TDS but less than 500 ppm TDS and the RO reject 220 may be a concentrate rich in monovalent ions and divalent ions. In some embodiments, the RO permeate 218 has a salinity of greater than 0 ppm TDS but less than 300 ppm TDS.

A second portion 222 of the seawater 202 is treated in the NF unit 208 to produce NF permeate 224 and NF reject 226. A portion of the NF reject 226 may be provided to the CGE unit 212. The NF permeate 224 may be recycled to mix with the seawater 202 fed to the water treatment apparatus 200. In some embodiments, the NF unit 208 may include a membrane having a pore size in the range of 0.05 microns to 0.005 microns and a molecular weight cutoff of 200 Daltons. The NF unit may reject divalent cations and sulfate ions and, in some embodiments, may have a rejection efficiency in the range of about 90% to about 99%. For example, if the feed water contains about 3,000 ppm sulfate ions, an NF unit operating at a rejection efficiency of 98% may produce NF permeate having 2% of sulfate ions (about 60 ppm). Consequently, the NF permeate 224 may be rich in monovalent ions and the NF reject 226 may be rich in divalent ions including sulfate ions In some embodiments, the NF reject 226 may have a salinity greater than about 50,000 ppm TDS but less than about 100,000 ppm TDS. In some embodiments, the NF permeate 224 may have a salinity of greater than 0 ppm TDS but less than about 40,000 ppm TDS.

The produced water 204 is pretreated in the pretreatment unit 210 to remove oil, grease, and solids to produced pretreated produced water 228. The produced water 104 is pretreated in the pretreatment unit 210 to remove oil, grease, and solids to produced pretreated produced water 204. The pretreatment unit 210 may include filtration-based pretreatment, chemical based filtration, or a combination thereof. For example, the pretreatment unit may be a filtration unit having a filtration media (e.g., nutshell filters), a chemical extraction unit that performs oxidation using suitable chemicals (e.g., ozone, hydrogen, and peroxide) and other selective chemical extraction, or a combination thereof. In some embodiments, the produced water 204 is high salinity produced water (for example, produced water having a salinity greater than 50,000 ppm TDS). Thus, in such embodiments, the pretreated produced water 228 also has a similar salinity to the produced water 204 fed to the pretreatment unit 210.

The pretreated produced water 228 may be mixed with the RO reject 220, and the mixed water 230 may be desalinated in the CGE unit 212 to produce fresh water 232. The CGE unit 212 may operate in a manner similar to the operation of the CGE unit 110 described above. In some embodiments, the CGE unit 212 has a recovery efficiency in the range of about 85% to about 90%. In some embodiments, a portion 234 of the NF reject 226 may be provided to the CGE unit 212 for desalination and additional production of the fresh water 232.

As shown in FIG. 2A, the fresh water 232 from the CGE unit 212 may be mixed with the RO permeate 218 and the NF reject 226 to generate the injection water 214 having ion concentrations suitable for enhancing oil recovery in carbonate reservoirs and having a salinity in the range of about 5,000 ppm TDS to about 6,000 ppm TDS. For example, the concentrations of divalent ions in the injection water 214 may be modified by adjusting the amount (e.g., volume) of divalent ion-rich NF reject 226 mixed with the RO permeate 218 and the fresh water 232. Similarly, the salinity of the injection water 214 may be modified to a desired salinity (for example, 5,000 ppm TDS to 6,000 ppm TDS) by diluting the NF reject 226 with the fresh water 232 and the RO permeate 218. In some embodiments, the water treatment apparatus 200 includes a mixer for mixing the fresh water 232 from the CGE unit 212, the RO permeate 218, and the NF reject 226. The mixer may include a static mixer or a powered mixing apparatus with moving components. The mixer may be, for example, an in-line mixer, a t-line mixer, or other suitable mixing apparatus. In some embodiments, the injection water 214 may be generated by mixing the NF reject 226 to the combined fresh water 232 and RO permeate 218 in a volumetric ratio in the range of about 5:95 to about 15:75. In some embodiments, the injection water 214 generated by the water treatment apparatus 200 may have a mass ratio of monovalent ions (sodium and chloride ions) to divalent ions (calcium, magnesium, and sulfate ions) in the range of about 1 to about 5. In some embodiments, the injection water 214 may have a mass ratio of monovalent ions (sodium and chloride ions) to divalent ions (calcium, magnesium, and sulfate ions) of about 2.

FIG. 2B depicts an alternate embodiment of the water treatment apparatus 200 for the production of injection water from seawater and production water in accordance with an embodiment of the disclosure. The water treatment apparatus 200 shown in FIG. 2B also includes production water treatment and may be a zero liquid discharge (ZLD) process. As shown in FIG. 2B, the water treatment apparatus 200 receives seawater 202 and produced water 204 and includes the reverse osmosis (RO) unit 206, the pretreatment unit 208, and a dynamic vapor recompression (DyVaR) unit 228 instead of the CGE unit 212.

As discussed above, the pretreated produced water 228 from the pretreatment unit 210 may be mixed with the RO reject 220 to produce the mixed water 230. As shown in FIG. 2B, the mixed water 230 may be desalinated in the DyVaR unit 228 to produce the fresh water 214. The DyVaR unit 228 may operate in a manner similar to the operation of the DyVaR unit 128 described above. In some embodiments, the DyVaR unit 228 may have a recovery efficiency of at least 97%. In some embodiments, a portion 234 of the NF reject 226 may be provided to the DyVaR unit 228 for desalination and additional production the fresh water 232

In some embodiments having the DyVaR unit 228, the pretreatment of the produced water 204 may be reduced or omitted. For example, the pretreatment unit 210 may include a less rigorous pretreatment or may be omitted from the water treatment apparatus 228. Thus, in some embodiments, the water treatment apparatus 200 shown in FIG. 1B may omit the pretreatment unit 210 and the DyVaR unit 228 may receive the produced water 204 without pretreatment.

As shown in FIG. 2B, the fresh water 232 from the DyVaR unit 228 may be mixed with the RO permeate 218 and the NF reject 226 to generate the injection water 214 having ion concentrations suitable for enhancing oil recovery in carbonate reservoirs and having a salinity in the range of about 5,000 ppm TDS to about 6,000 ppm TDS. For example, the concentrations of divalent ions in the injection water 214 may be modified by adjusting the amount (e.g., volume) of divalent ion-rich NF reject 226 mixed with the RO permeate 218 and the fresh water 232. Similar, the salinity of the injection water 214 may be modified to a desired salinity (for example, 5,000 ppm TDS to 6,000 ppm TDS) by diluting the NF reject 226 with the fresh water 232 and the RO permeate 218. In some embodiments, the water treatment apparatus 200 includes a mixer for mixing the fresh water 232 from the DyVaR unit 228, the RO permeate 218, and the NF reject 226. The mixer may include a static mixer or a powered mixing apparatus with moving components. The mixer may be, for example, an in-line mixer, a t-line mixer, or other suitable mixing apparatus. In some embodiments, the injection water 214 may be generated by mixing the NF reject 226 to the combined fresh water 232 and RO permeate 218 in a volumetric ratio in the range of about 5:95 to about 15:75. In some embodiments, the injection water 214 generated by the water treatment apparatus 200 may have a mass ratio of monovalent ions (sodium and chloride ions) to divalent ions (calcium, magnesium, and sulfate ions) of about 2.

In some embodiments, the inlet streams and outlet streams of one or more units of water treatment apparatus 200 may be analyzed for salinity and the concentration of various ions. For example, the outlet streams of the units of water treatment apparatus 200 may be analyzed using ion chromatography to determine ion concentrations. In some embodiments, the water treatment apparatus 200 may include real-time water composition monitoring sensor water treatment apparatus at various locations for determining salinity and ion concentrations of different inlet streams and outlet streams. In some embodiments, for example, the inlet streams, the outlet streams, or both of the RO unit 206, the NF unit 208, the CGE unit 212, the DyVaR unit 228, or any combination thereof may be analyzed to determine salinity and ion concentration.

The operation of the water treatment apparatus 200 depicted in FIGS. 2A and 2B may be varied to achieve a desired specification of injection water 214. For example, the concentration of divalent ions in the injection water 214 may be increased and the concentration of monovalent ion in the injection 214 may be decreased by mixing a greater amount of the NF reject 226 with the RO permeate 218 and fresh water 232. In some embodiments, the salinity and ion concentration (e.g., divalent ion concentration and monovalent ion concentration) in the injection water 214 may be measured using an analyzer and the volumetric ratio of the NE reject 226 to the combined RO permeate 218 and fresh water 232 may be adjusted based on the measured salinity and ion concentration.

Example Compositions and Injection Water Produced by the Water Treatment Apparatus The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

Examples of water treatment apparatus 100 and 200 were operated in the manner described above and the composition of various outlet streams, including the generated injection water, was measured. In the example water treatment apparatus, the recovery efficiency of the RO unit was 50% and the recovery efficiency of the NF unit was 75%. The composition of the fresh water produced by the CGE unit or the DyVaR unit in each water treatment apparatus was assumed to be the same as the RO permeate exiting the RO unit. The injection water produced by the example of water treatment apparatus 100 was produced by mixing 14% volume of the total volume (v/v %) seawater and 86 v/v % of the combined RO permeate and fresh water from the CGE unit or DyVaR unit. The injection water produced by the example of water treatment apparatus 200 was produced by mixing 10 v/v % of the NF reject with 90 v/v % of the combined RO permeate and fresh water from the CGE unit or DyVaR unit.

Table 1 lists the composition of feed seawater and the compositions of RO permeate (and assumed concentrations of fresh water from the CGE unit or DyVaR unit), NF permeate, NF filtrate, and generated injection water produced by the examples of water treatment apparatus 100 and 200 operated in the manner described above:

TABLE 1

Summary of Water Compositions For Example Water Treatment Apparatus

| Ion | Seawater Composition (ppm) | Nanofiltration (NF) | | RO/CGE/ DyVaR Fresh Water Composition (ppm) | Injection water produced by example water treatment apparatus 100 (ppm) | Injection water produced by example water treatment apparatus 200 (ppm) |
| --- | --- | --- | --- | --- | --- | --- |
| | | NF Permeate Composition (ppm) | NF Reject Composition (ppm) | | | |
| $Na^+$ | 11200 | 10688 | 12736 | 81 | 1637.66 | 1346.5 |
| $Ca^{+2}$ | 400 | 330 | 610 | 1 | 56.86 | 61.9 |
| $Mg^{+2}$ | 1400 | 309 | 4673 | 4 | 199.44 | 470.9 |
| $SO_4^{-2}$ | 2650 | 48 | 10456 | 8 | 377.88 | 1052.8 |
| $Cl^-$ | 19750 | 19000 | 22000 | 136 | 2881.96 | 2322.4 |
| TDS | 35400 | 30375 | 50475 | 230 | 5153.8 | 5254.5 |

As shown in Table 1, the injection waters produced from the example of water treatment apparatus 100 and example of water treatment apparatus 200 have a salinity of between 5100 ppm TDS to 5300 ppm TDS. However, the injection water produced by the example of water treatment apparatus 200 has a greater concentration of divalent ions (e.g., sulfates, calcium, and magnesium) and a lower concentration of monovalent ions (e.g., calcium and chlorine) as compared to the injection water produced by the example of water treatment apparatus 100. As shown by the composition measurements in Table 1, the concentrations of divalent ions in the injection water generated by the example water treatment apparatus 200 were about 2 to 3 times greater than the injection water generated by the example of water treatment apparatus 100. Additionally, the concentrations of monovalent ions in the injection water generated by the example of water treatment apparatus 200 were about 20% less than the injection water generated by the example of water treatment apparatus 100.

Figure 3:
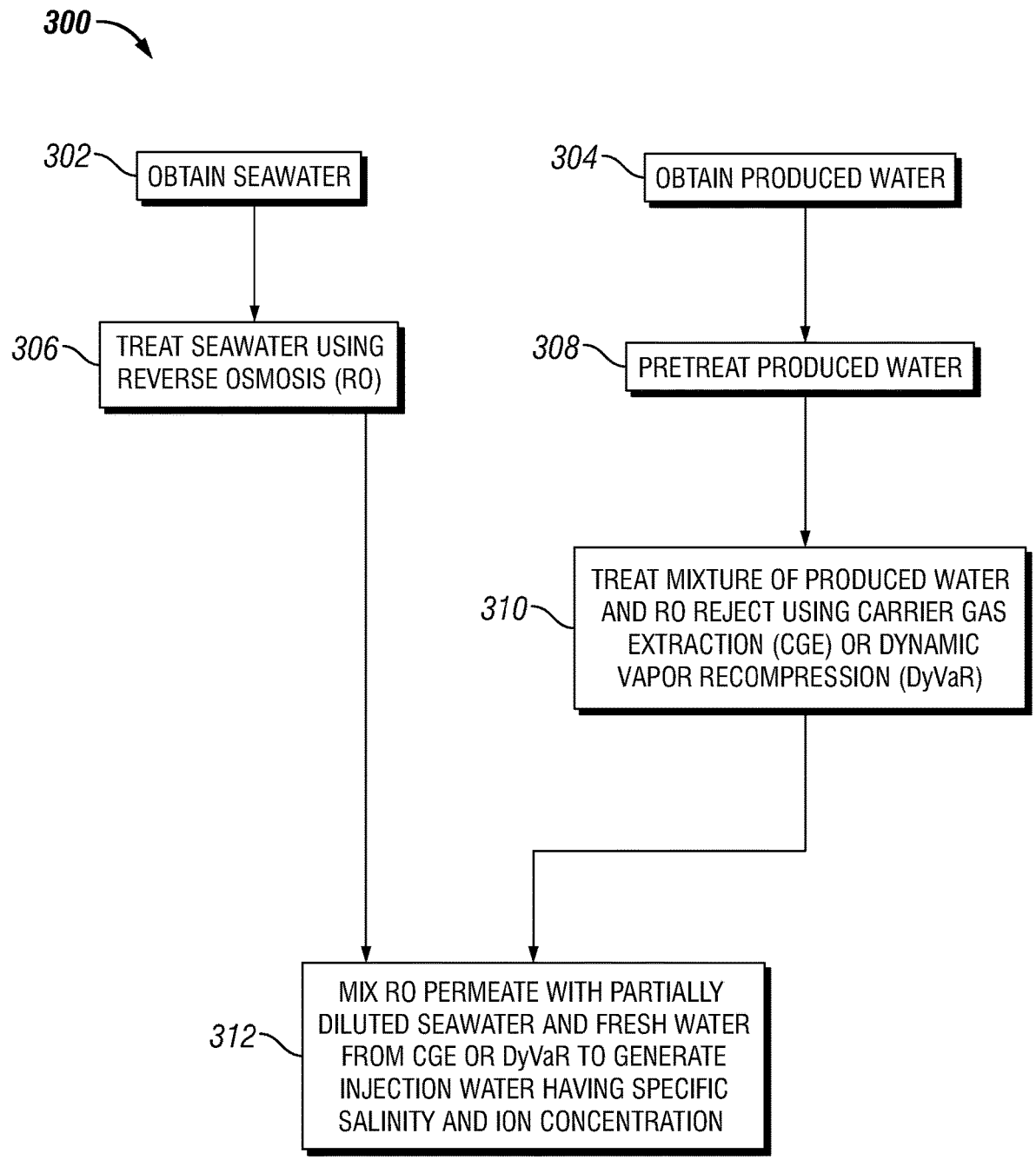
FIG. 3 is a flowchart of a process for producing injection water from seawater and produced water using the water treatment apparatus depicted in FIGS. 1A and 1B in accordance with embodiments of the disclosure.

Processes for the Generation of Injection Water from Seawater and Produced Water FIG. 3 depicts a process 300 for the generation of injection water according to the water treatment apparatus 100 depicted in FIGS. 1A and 1B and discussed above, in accordance with embodiments of the disclosure. As shown in FIG. 3, initially seawater and produced water may be obtained (blocks 302 and 304 respectively). For example, seawater may be obtained from oceans or other sources and obtained offshore or pumped inshore for use at an oil and gas production site. The produced water may be obtained as a byproduct from operations conducted at an oil and gas production site. For example, produced water may be produced from hydrocarbon reservoirs during production from the reservoir and may be further produced as a result of secondary and tertiary oil recovery operations.

The seawater may be treated using RO (block 306). As discussed above, the treatment of seawater via RO may produce an RO permeate of fresh water having a salinity of less than 500 ppm TDS and an RO reject of a concentrate rich in monovalent ions and divalent ions. The produced water may be pretreated (block 308) according to the pretreatment techniques described above. Next, a mixture of pretreated produced water and RO reject may be treated using CGE or DyVaR to produce fresh water (block 310).

Next, the fresh water from the CGE or DyVaR may be mixed with RO permeate and seawater to generate injection water having a specific salinity and ion concentration (block 312). As discussed above, for example, in some embodiments the generated injection water may have a salinity in the range of 5,000 ppm TDS to about 6,000 ppm TDS and a specific ratio of divalent ions to monovalent ions.

Figure 4:
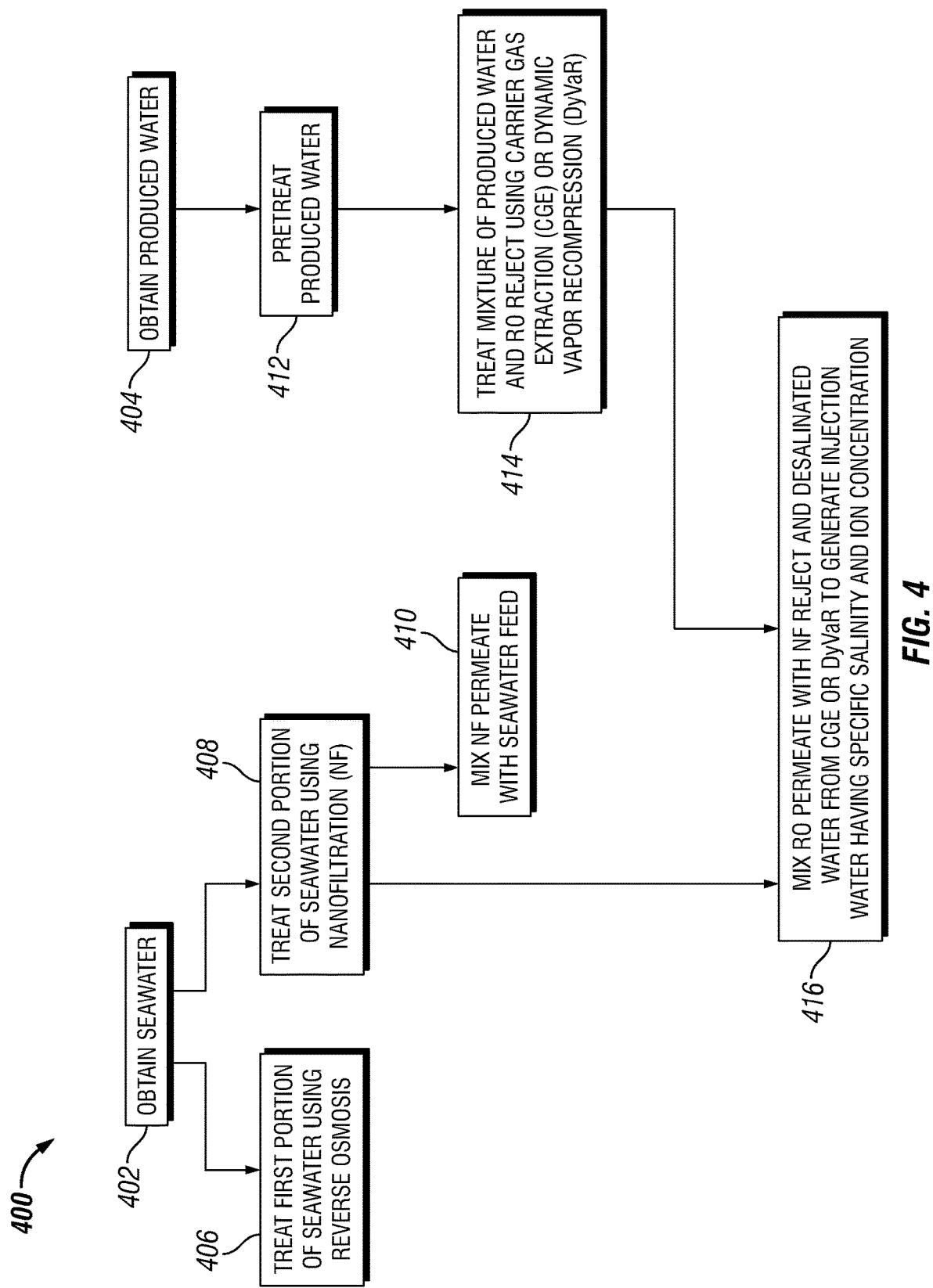
FIG. 4 is a flowchart of a process for producing injection water from seawater and produced water using the water treatment apparatus depicted in FIGS. 2A and 2B in accordance with embodiments of the disclosure.

FIG. 4 depicts a process 400 for the generation of injection water according to the water treatment apparatus 200 depicted in FIGS. 2A and 2B and discussed above, in accordance with embodiments of the disclosure. As shown in FIG. 4, initially seawater and produced water may be obtained (blocks 402 and 404 respectively). As mentioned above, for example, seawater may be obtained from oceans or other sources and obtained offshore or pumped inshore for use at an oil and gas production site. The produced water may be obtained as a byproduct from operations conducted at an oil and gas production site. For example, produced water may be produced from hydrocarbon reservoirs during production from the reservoir and may be further produced as a result of secondary and tertiary oil recovery operations.

A first portion of the seawater may be treated using RO (block 406). As discussed above, the treatment of seawater via RO may produce an RO permeate of fresh water having a salinity of greater than 0 ppm TDS but less than 500 ppm TDS and an RO reject of a concentrate rich in monovalent ions and divalent ions. A second portion of the sweater may be treated using NF (block 408). As discussed above, the treatment of seawater via NF may produce an NF permeate rich in monovalent ions and an NF reject rich in divalent ions and sulfate ions. In some embodiments, the NF permeate may be recycled to mix with the seawater feed (block 410).

The produced water may be pretreated (block 412) according to the pretreatment techniques described above. Next, a mixture of pretreated produced water and RO reject may be treated using CGE or DyVaR to produce fresh water (block 414). Next, RO permeate may mixed with the NF reject and fresh water to generate injection water having a specific salinity and ion concentration (block 416). As discussed above, for example, in some embodiments the generated injection water may have a salinity in the range of 5,000 ppm TDS to about 6,000 ppm TDS and a specific ratio of divalent ions to monovalent ions.

Water Treatment Apparatus for Generating Injection Water from Seawater

Figure 5A:
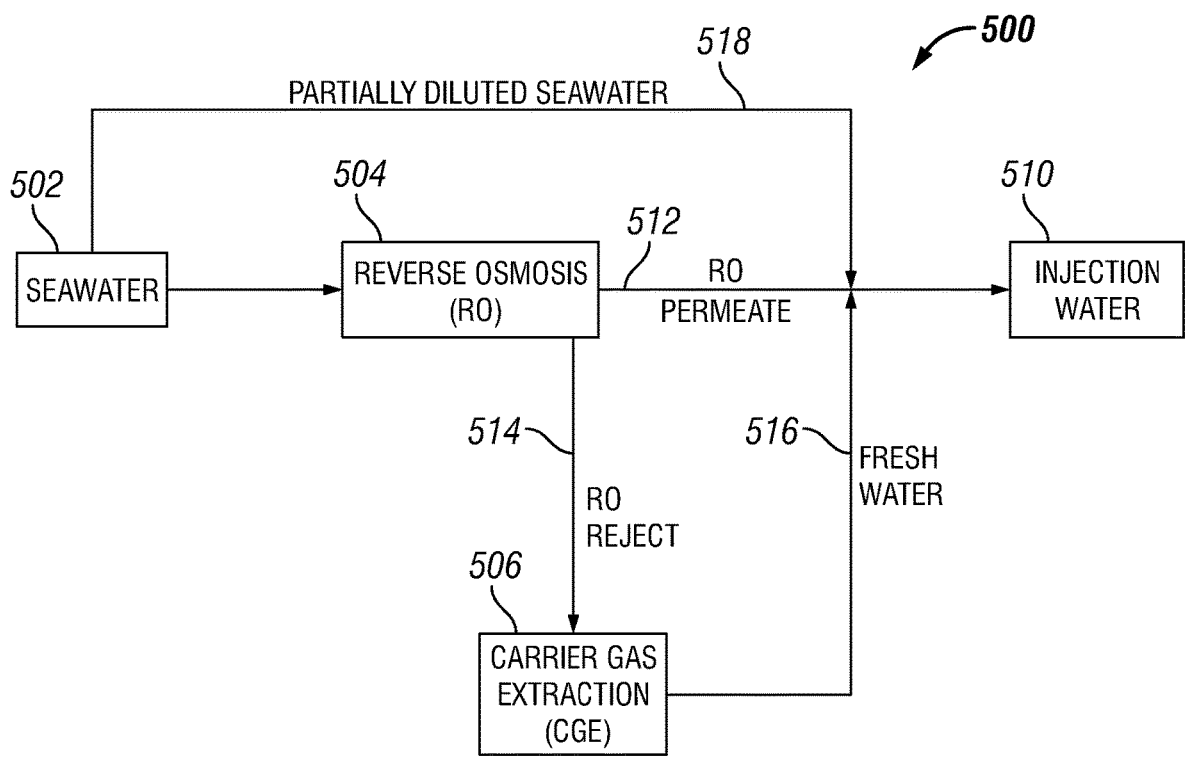
FIGS. 5A and 5B are schematic diagrams of a water treatment apparatus for generating injection water from seawater in accordance with additional embodiments of the disclosure.
Figure 5B:
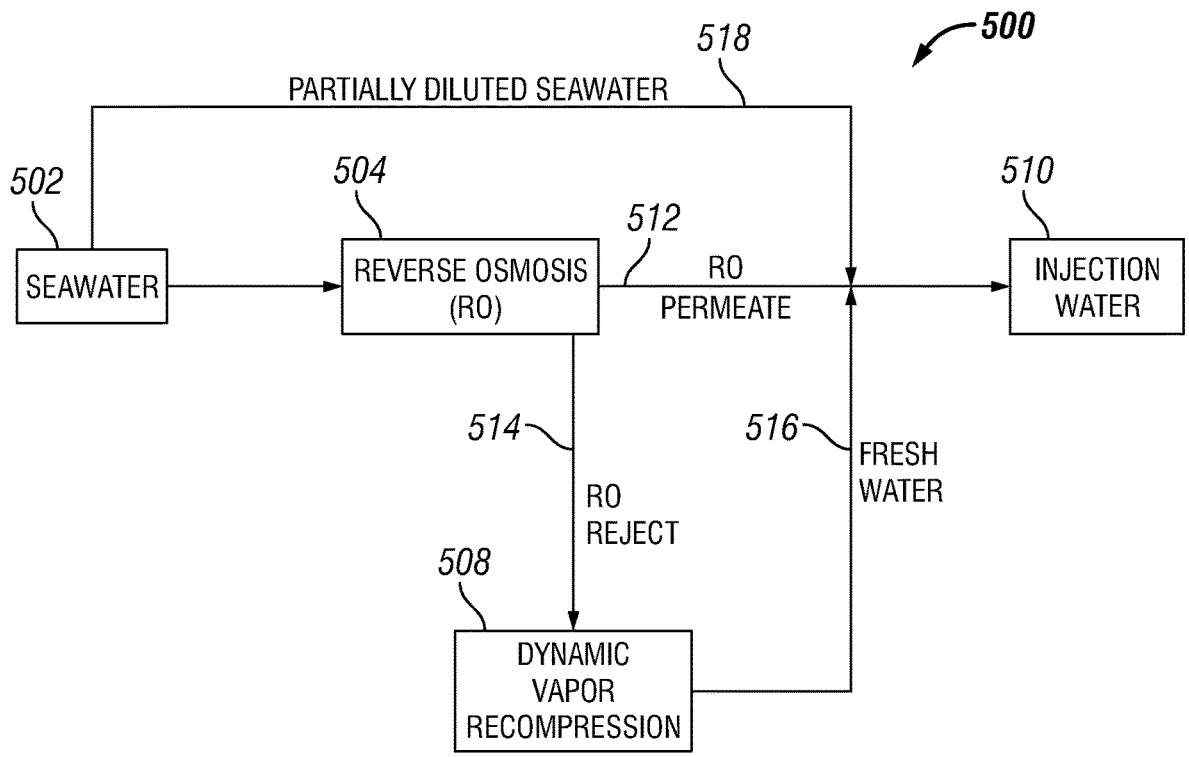

In some embodiments, injection water may be generated from seawater without the use of produced water. FIGS. 5A and 5B depict a water treatment apparatus 500 for the generation of injection water from seawater in accordance with additional embodiments of the disclosure. As shown in FIGS. 5A and 5B, the water treatment apparatus 500 receives seawater 502 and includes a reverse osmosis (RO) unit 504. In some embodiments, as shown in FIG. 5A, the water treatment apparatus 500 includes a carrier gas extraction (CGE) unit 506. In other embodiments, as shown in FIG. 5B, the water treatment apparatus 500 includes a dynamic vapor recompression (DyVaR) unit 508 instead of the CGE unit 506. The water treatment apparatus 500 generates injection water 510 for use in EOR operations.

As shown in FIGS. 5A and 5B, the seawater 502 is treated in the RO 504 106 to produce RO permeate 512 and RO reject 514. In some embodiments, the RO unit 504 has a membrane with a pore size of less than 0.00005 microns. The RO unit 504 may be similar to the RO units described above and, in some embodiments, the RO unit 504 may operate at a rejection efficiency of greater than 99%. The RO unit 504 may reject both divalent ions and monovalent ions such that the RO permeate 512 may be fresh water having a salinity of less than 500 ppm (but greater than 0 ppm TDS) and the RO reject 514 may be a concentrate rich in monovalent ions and divalent ions.

The RO reject 514 may be desalinated in the CGE unit 110 to produce fresh water 516. The CGE unit 506 may be similar to the CGE units 110 and 212 described above and may operate in the same manner. For example, in some embodiments, the CGE unit 110 has a recovery efficiency in the range of about 85% to about 90%.

As shown in FIG. 5A, the fresh water 516 may be mixed with the RO permeate 512 and a portion 518 of the seawater 502 to produce an injection water 510 having one or more salts suitable for enhancing oil recovery in carbonate reservoirs and having a salinity in the range of about 5,000 ppm TDS to about 6,000 ppm TDS. In some embodiments, the water treatment apparatus 500 includes a mixer for mixing the fresh water 516, the RO permeate 512, and a portion 518 of the seawater 502. The mixer may include a static mixer or a powered mixing apparatus with moving components. The mixer may be, for example, an in-line mixer, a t-line mixer, or other suitable mixing apparatus.

FIG. 5B depicts an alternate embodiment of the water treatment apparatus 500 for the production of injection water from seawater in accordance with an embodiment of the disclosure. As shown in FIG. 5B, the water treatment apparatus 100 receives seawater 502 and includes the reverse osmosis (RO) unit 504 and a dynamic vapor recompression (DyVaR) unit 508. The water treatment apparatus 500 outputs injection water 510 for use in EOR operations.

The RO reject 514 may be desalinated in the DyVaR unit 508 to produce fresh water 516. The DyVaR unit 508 may be similar to the DyVaR units 128 and 228 described above. For example, in some embodiments, the DyVaR unit 128 may have a recovery efficiency of at least 97%.

As shown in FIG. 5B, the fresh water 516 (i.e., fresh water) may be mixed with the RO permeate 512 and the portion 518 of the seawater 502 to produce the injection water 510 having one or more salts suitable for enhancing oil recovery in carbonate reservoirs and having a salinity in the range of about 5,000 ppm TDS to about 6,000 ppm TDS. In some embodiments, the water treatment apparatus 500 includes a mixer for mixing the fresh water 516, the RO permeate 512, and a portion 518 of the seawater 502. The mixer may include a static mixer or a powered mixing apparatus with moving components. The mixer may be, for example, an in-line mixer, a t-line mixer, or other suitable mixing apparatus. Here again, mixing the seawater 124 with the fresh water (i.e., the fresh water 122 and RO permeate 114) may provide for the depletion of monovalent ions while maintaining minimum specific amounts of divalent ions in the injection water 124.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described herein. It is to be understood that the forms shown and described herein are to be taken as examples of embodiments. Elements and materials may be substituted for those illustrated and described herein, parts and processes may be reversed or omitted, and certain features may be utilized independently, all as would be apparent to one skilled in the art after having the benefit of this description. Changes may be made in the elements described herein without departing from the spirit and scope of the disclosure as described in the following claims. Headings used herein are for organizational purposes only and are not meant to be used to limit the scope of the description.

What is claimed is:

1. A method for generating injection water from seawater and produced water, comprising:
   providing seawater to a reverse osmosis (RO) unit operable to produce an RO permeate and an RO reject;
   providing produced water to a pretreatment unit to produce the pretreated produced water;
   providing pretreated produced water and the RO reject to a carrier gas extraction (CGE) unit or a dynamic vapor recompression (DyVaR) unit operable to produce fresh water, the dynamic vapor compression (DyVaR) unit comprising a cyclone in an evaporation stage; and
   mixing the fresh water the RO permeate and a portion of the seawater to generate injection water, the injection water comprising a salinity in the range of 5,000 parts-per-million (ppm) TDS to 6,000 ppm TDS.

2. The method of claim 1, wherein the RO permeate has a salinity of less than 500 ppm TDS.

3. The method of claim 1, wherein the produced water comprises a salinity of at least 50,000 ppm TDS.

4. The method of claim 1, wherein the volumetric ratio of the portion of seawater to a combination of the fresh water and the RO permeate is in the range of 10:90 to 20:80.

5. A method for generating injection water from seawater and produced water, comprising:
   providing a first portion of seawater to a reverse osmosis (RO) unit operable to produce an RO permeate and an RO reject;
   providing a second portion of the seawater to a nanofiltration (NF) unit operable to produce an NF permeate and an NF reject;
   providing produced water to a pretreatment unit to produce the pretreated produced water;
   providing pretreated produced water and the RO reject to a carrier gas extraction (CGE) unit or a dynamic vapor recompression (DyVaR) unit operable to produce fresh water, the dynamic vapor compression (DyVaR) unit comprising a cyclone in an evaporation stage; and
   mixing the fresh water with the RO permeate and NF reject to generate injection water, the injection water comprising a salinity in the range of 5,000 parts-per-million ppm TDS to 6,000 ppm TDS.

6. The method of claim 5, wherein the RO permeate has a salinity of less than 500 ppm TDS.

7. The method of claim 5, wherein the NF reject has a salinity of at least 50,000 ppm TDS.

8. The method of claim 5, wherein the NF permeate has a salinity of less than 40,000 ppm TDS.

9. The method of claim 5, wherein the produced water comprises a salinity of at least 50,000 ppm TDS.

10. The method of claim 5, comprising recycling the NF permeate to mix with the seawater.

11. The method of claim 5, comprising providing a portion of the NF reject to the CGE unit of the DyVaR unit to produce the fresh water.

12. The method of claim 5, wherein the volumetric ratio of the NF reject to a combination of the fresh water and the RO permeate is in the range of 5:95 to 15:75.

* * * * *